United States Patent
Forti et al.

(10) Patent No.: US 11,480,209 B2
(45) Date of Patent: Oct. 25, 2022

(54) DEFORMABLE TAPPING PLATE

(71) Applicant: Newfrey LLC, New Britain, CT (US)

(72) Inventors: Adam A. Forti, Troy, MI (US);
Thomas J. Lerch, Shelby Township, MI (US); Raymond M. Genick, II, Chesterfield, MI (US)

(73) Assignee: Newfrey LLC, New Britain, CT (US)

( * ) Notice: Subject to any disclaimer, the term of this patent is extended or adjusted under 35 U.S.C. 154(b) by 476 days.

(21) Appl. No.: 16/778,446

(22) Filed: Jan. 31, 2020

(65) Prior Publication Data

US 2020/0291980 A1 Sep. 17, 2020

Related U.S. Application Data

(60) Provisional application No. 62/817,668, filed on Mar. 13, 2019.

(51) Int. Cl.
*F16B 37/04* (2006.01)
*B60J 5/04* (2006.01)
*E05B 79/02* (2014.01)

(52) U.S. Cl.
CPC .......... *F16B 37/04* (2013.01); *B60J 5/0468* (2013.01); *E05B 79/02* (2013.01)

(58) Field of Classification Search
CPC ........ F16B 37/00; F16B 37/04; F16B 37/041; F16B 37/044; F16B 37/045; F16B 39/10; F16B 39/24; B60J 5/0468; E05B 79/02; Y10S 411/97
USPC ...................... 411/172, 173–175, 427, 432
See application file for complete search history.

(56) References Cited

U.S. PATENT DOCUMENTS

| | | | |
|---|---|---|---|
| 4,323,271 A | 4/1982 | Taniguchi | |
| 6,814,401 B2 | 11/2004 | Takada | |
| 6,910,728 B2 | 6/2005 | Seo | |
| 7,628,445 B2 * | 12/2009 | Chen | E05B 85/045 |
| | | | 296/193.06 |

(Continued)

FOREIGN PATENT DOCUMENTS

| | | |
|---|---|---|
| CN | 205186294 U | 4/2016 |
| CN | 108625696 A | 10/2018 |

(Continued)

OTHER PUBLICATIONS

Extended European Search Report in corresponding European Patent Application No. EP 20158400 dated Jul. 15, 2020.

*Primary Examiner* — Roberta S Delisle
(74) *Attorney, Agent, or Firm* — Harness, Dickey & Pierce, P.L.C.

(57) ABSTRACT

A deformable tapping plate can include a central member including at least two mounting openings and a mounting surface wherein the mounting surface defines a mounting plane. The deformable tapping plate can also include a first attachment pad located adjacent a first end of the central member that is connected to the central member by a first connecting arm. The first attachment pad includes a first attachment surface defining an attachment plane. The first connecting arm can include a first arched portion that projects away from both the mounting plane and the attachment plane and can include a first narrowed apex having a thickness that is less than a thickness of adjacent portions of the first arched portion.

20 Claims, 12 Drawing Sheets

(56) References Cited

U.S. PATENT DOCUMENTS

| | | | |
|---|---|---|---|
| 7,841,650 B2 * | 11/2010 | Chen | B62D 25/04 |
| | | | 296/193.06 |
| 7,909,372 B2 | 3/2011 | Yamada | |
| 8,469,413 B2 | 6/2013 | Novajovsky et al. | |
| 2004/0119300 A1 | 6/2004 | Strable et al. | |
| 2007/0005066 A1 * | 1/2007 | Johnson | F16B 37/044 |
| | | | 606/301 |
| 2007/0130728 A1 * | 6/2007 | Duerr | F16B 37/00 |
| | | | 16/382 |
| 2008/0217930 A1 | 9/2008 | Bennett | |
| 2008/0217932 A1 | 9/2008 | Yamada | |
| 2011/0316294 A1 | 12/2011 | Kim et al. | |
| 2018/0222294 A1 | 8/2018 | Cumbo et al. | |
| 2020/0173486 A1 * | 6/2020 | Tulloch | F16B 39/10 |

FOREIGN PATENT DOCUMENTS

| | | |
|---|---|---|
| DE | 10336810 A1 | 3/2005 |
| DE | 102016103948 A1 | 9/2017 |
| EP | 2011679 A1 | 1/2009 |
| GB | 1518049 A | 7/1978 |
| JP | H0257427 A | 2/1990 |
| KR | 20050005079 A | 1/2005 |
| KR | 100494427 B1 | 6/2005 |
| KR | 100890118 B1 | 3/2009 |
| WO | WO-2008/074270 A2 | 6/2008 |

* cited by examiner

DEFORMABLE TAPPING PLATE

CROSS-REFERENCE TO RELATED APPLICATIONS

This application claims the benefit of U.S. Provisional Application No. 62/817,668 filed on Mar. 13, 2019. The entire disclosure of the above application is incorporated herein by reference

FIELD

The present disclosure relates to deformable tapping plates and related methods, and to such tapping plates and methods having particular applicability attaching a door striker to a sheet metal body of a vehicle.

BACKGROUND

This section provides background information related to the present disclosure which is not necessarily prior art.

Reinforcement or tapping plates can often be attached at mounting locations of components in vehicles that require adjustment. The reinforcement plates can be fixed to the structure of the vehicle to provide rigidity and support at hinges, latches, strikers, actuators, and other components that can experience localized stress concentrations in connection with the repeated movement of doors, trunk lids, hoods, liftgates and the like.

For example, a reinforcement plate can be used to mount a striker on the bodyside of a vehicle. The striker can be a ring, loop or other shape that is captured by a cooperating latch on the vehicle door. When the door is closed, the striker is retained by the latch and maintains the door in the closed position. The reinforcement plate can be added to the bodyside 30 at the location of the striker to add rigidity and support to the bodyside 30 and to allow adjustment of the striker relative to the latch.

In addition to retaining the door in a closed position, the dimensional relationship between the striker and the latch can also affect the operation of the latch and the relative positioning of the door to the opening in the vehicle bodyside. For example, the relationship between the striker and the latch can affect the opening and closing efforts required to open and close the door. In addition, an undesirable orientation of the striker to the latch can cause undesirable noises to occur (e.g., squeaks and rattles) during the opening and/or closing of the door and/or during operation of the vehicle.

Further, it can be desirable to maintain a constant and/or aesthetically pleasing gap around a periphery of the door when the door is in a closed position in the bodyside opening. The fit of the door in the bodyside can be particularly difficult to control dimensionally in light of the tolerance stack-up that can occur during the assembly of multiple mating parts in a vehicle structure. Since the reinforcement plate that can be used for a striker is often placed inside a closed section of the bodyside (e.g., inside the B-pillar or the C-pillar), the reinforcement plate is often assembled into the bodyside before the body side undergoes e-coating and painting. The striker is then often assembled to the reinforcement plate after e-coating and painting. The striker often requires adjustment during the assembly process to correct the relative positioning of the striker to the door latch to achieve an optimal fit between the door and the bodyside.

Thus, it is desirable to provide a reinforcement tapping plate that that is compatible for assembly into a vehicle body prior to e-coating and painting and that can be positionally adjusted to achieve a desired position of a striker relative to a mating latch in the vehicle door.

SUMMARY

This section provides a general summary of the disclosure, and is not a comprehensive disclosure of its full scope or all of its features.

In accordance with one aspect of the present disclosure, a deformable tapping plate can include a central member including at least two mounting openings and a mounting surface and the mounting surface can define a mounting plane. A first attachment pad can be located adjacent a first end of the central member and can be connected to the central member by a first connecting arm. The first attachment pad can include a first attachment surface. A second attachment pad can be located adjacent to a second end of the central member opposite to the first attachment pad and can be connected to the central member by a second connecting arm. The second attachment pad can include a second attachment surface oriented co-planar with the first attachment surface to define an attachment plane. The first connecting arm can include a first arched portion projecting away from both the mounting plane and the attachment plane and can include a first narrowed apex having a thickness that is less than a thickness of an adjacent portion of the first arched portion. The second connecting arm can include a second arched portion projecting away from both the mounting plane and the attachment plane and can include a second narrowed apex having a thickness that is less than a thickness of an adjacent portion of the second arched portion. A single continuous sheet of metal can form each of the first and second attachment pads, the first and second connecting arms, and at least a portion of the central member.

In accordance with another aspect of the present disclosure, a deformable tapping plate can include a central member including at least two mounting openings and a mounting surface and the mounting surface can define a mounting plane. A first attachment pad can be located adjacent a first end of the central member and can be connected to the central member by a first pair of connecting arms. The first attachment pad can include a first attachment surface. A second attachment pad can be located adjacent to a second end of the central member opposite to the first attachment pad and can be connected to the central member by a second pair of connecting arms. The second attachment pad can include a second attachment surface oriented substantially co-planar with the first attachment surface to define an attachment plane. The first pair of connecting arms can each include a first arched portion projecting away from both the mounting plane and the attachment plane and including a first narrowed apex having a thickness that is less than a thickness of an adjacent portion of the first arched portion. Each of the first pair of connecting arms can include a first lateral extension connected to one end of the first arched portion with the first lateral extension including a first notched section having a thickness that is less than a thickness of an adjacent portion of the first lateral extension. The second pair of connecting arms can each include a second arched portion projecting away from both the mounting plane and the attachment plane and can include a second narrowed apex having a thickness that is less than a thickness of an adjacent portion of the second arched portion. Each of the second pair of connecting arms can include a second lateral extension connected to one end of the second arched portion with the second lateral extension including a second notched section having a thickness that is less than a thickness of an adjacent portion of the second lateral extension. A single continuous sheet of metal can form each of the first and second attachment pads, the first and second connecting arms, and at least a portion of the central member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
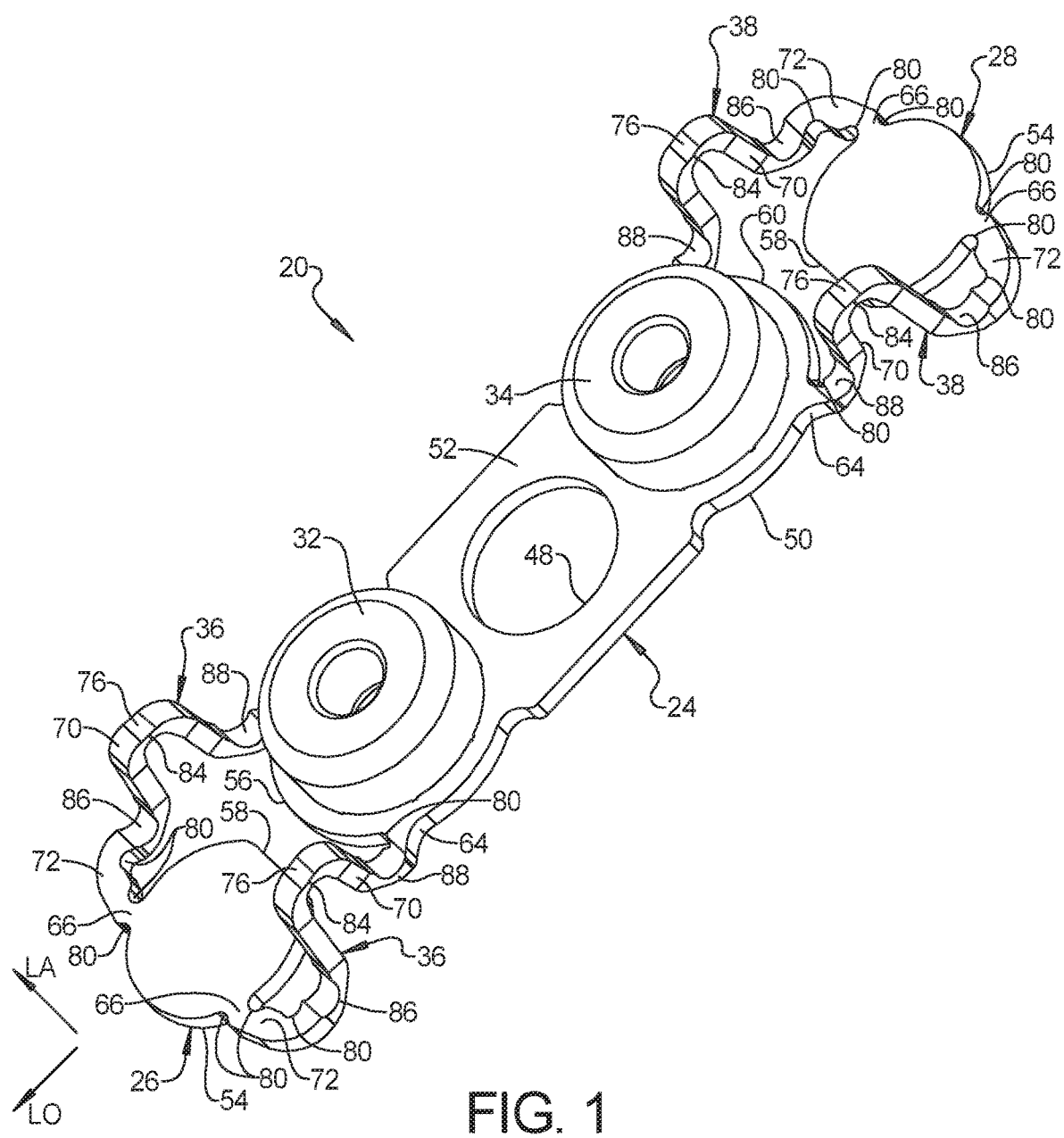
FIG. 1 is a perspective view of a back side of an example tapping plate in accordance with the present disclosure.

Example embodiments will now be described more fully with reference to the accompanying drawings.

With reference to FIGS. 1-10, an example tapping plate 20 is shown. The tapping plate 20 can include a central member 24, a first attachment pad 26 and a second attachment pad 28. The central member 24 can support a first nut 32 and a second nut 34. The first attachment pad 26 and the second attachment pad 28 can be positioned at opposite ends of the central member 24. The first attachment pad 26 can be connected to the central member 24 by a first pair of connecting arms 36 and the second attachment pad 28 can be connected to the central member 24 by a second pair of connecting arms 38.

For purposes of the present disclosure, the tapping plate 20 can be described to have a longitudinal direction and a lateral direction. The longitudinal direction, generally indicated by the arrow LO on FIG. 1, is aligned in a direction along the length of the tapping plate 20 and is substantially parallel to a direction that passes through the center axes of the first nut 32 and the second nut 34. The lateral direction, generally indicated by the arrow LA on FIG. 1, is aligned in a direction across the width of the tapping plate 20 and is substantially perpendicular to the longitudinal direction.

The tapping plate 20, in an example application, can be fixed on the backside of a door opening in a vehicle. The tapping plate 20 can be fixed at the desired location by welding the first attachment pad 26 and the second attachment pad 28 to a bodyside 30 at the door opening. In this manner, the central member 24 is suspended at the desired location in the bodyside 30 between the first attachment pad 26 and the second attachment pad 28. The tapping plate 20 can be coupled to the bodyside 30 and travel with the bodyside 30 through the e-coating and painting processes before a striker 42 is attached to the tapping plate 20 at the first nut 32 and the second nut 34. As will be further described below, the central member 24 is designed to be adjustable so that the precise location of the striker 42 can be adjusted by moving the central member 24 relative to the fixed first attachment pad 26 and the second attachment pad 28.

In the example shown, the central member 24 can be moved relative to the first attachment pad 26 and the second attachment pad 28 by applying a force to the central member 24. During the installation of the striker 42 to the tapping plate 20, the central member 24 can first move relative the first attachment pad 26 and the second attachment pad 28 in a direction toward the bodyside 30 (or other mating surface). Such movement can occur, for example, when fasteners are used to connect the striker 42 to the first nut 32 and the second nut 34. The central member 24 can also move in the lateral and the longitudinal directions after the striker 42 is secured to the tapping plate 20 by applying a force to the striker 42. When sufficient force is applied, one or more of the connecting arms 36, 38 can plastically deform and cause the location of the central member 24 to change relative to the first attachment pad 26 and the second attachment pad 28.

Figure 5:
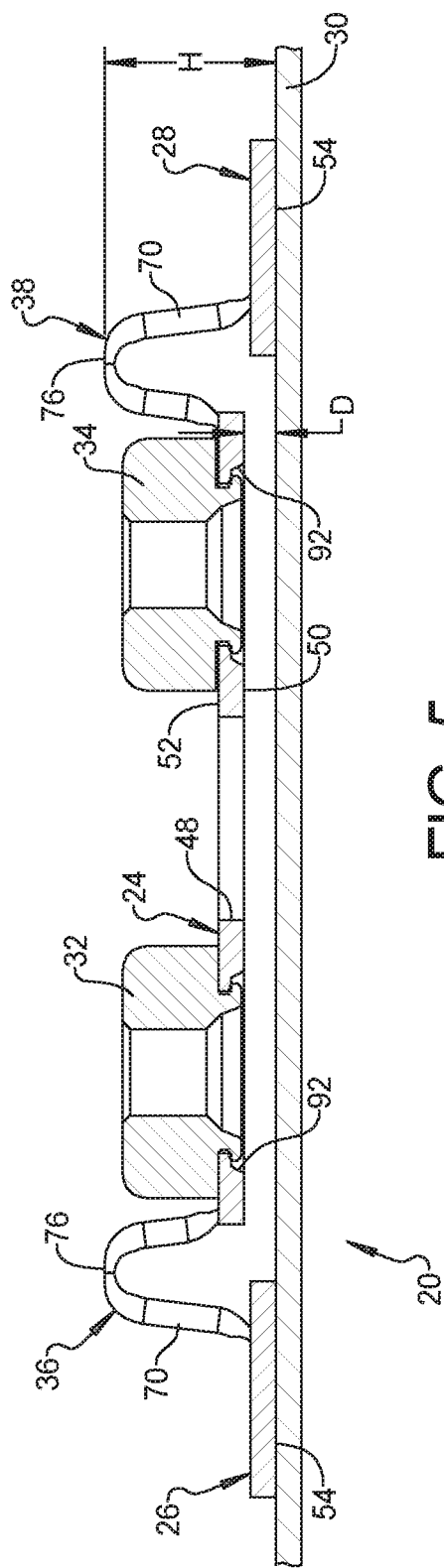
FIG. 5 is a side sectional view of the tapping plate of FIG. 1 shown along the cutting plane indicated on FIG. 4.
Figure 8:
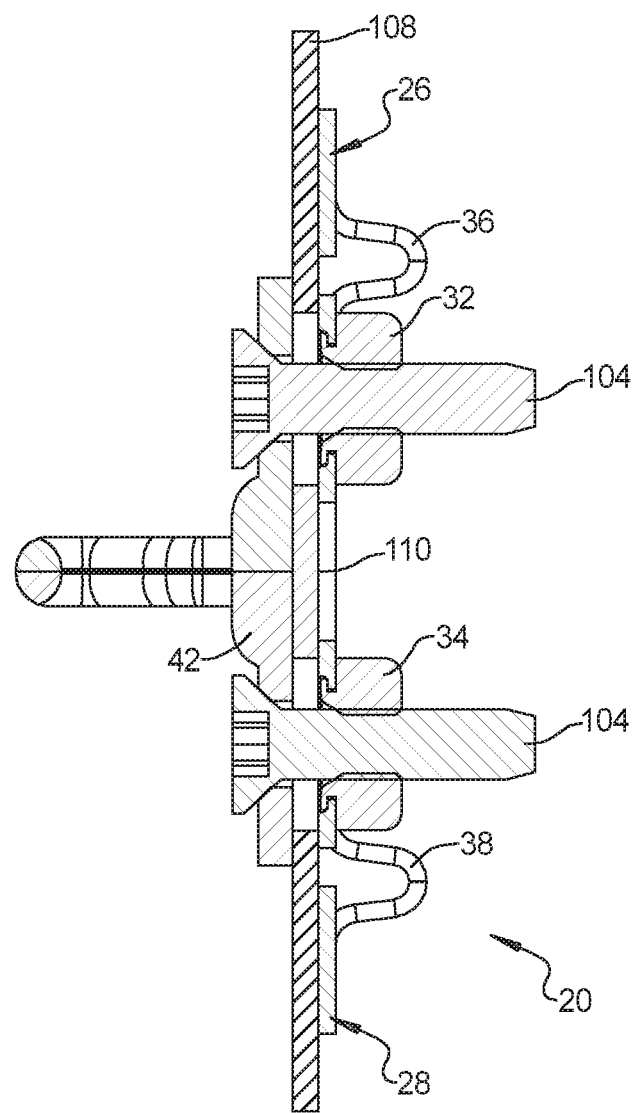
FIG. 8 is a side sectional view of the assembly of FIG. 7 along the cutting plane as indicated in FIG. 7 showing the striker secured to the panel by the tapping plate.
Figure 9:
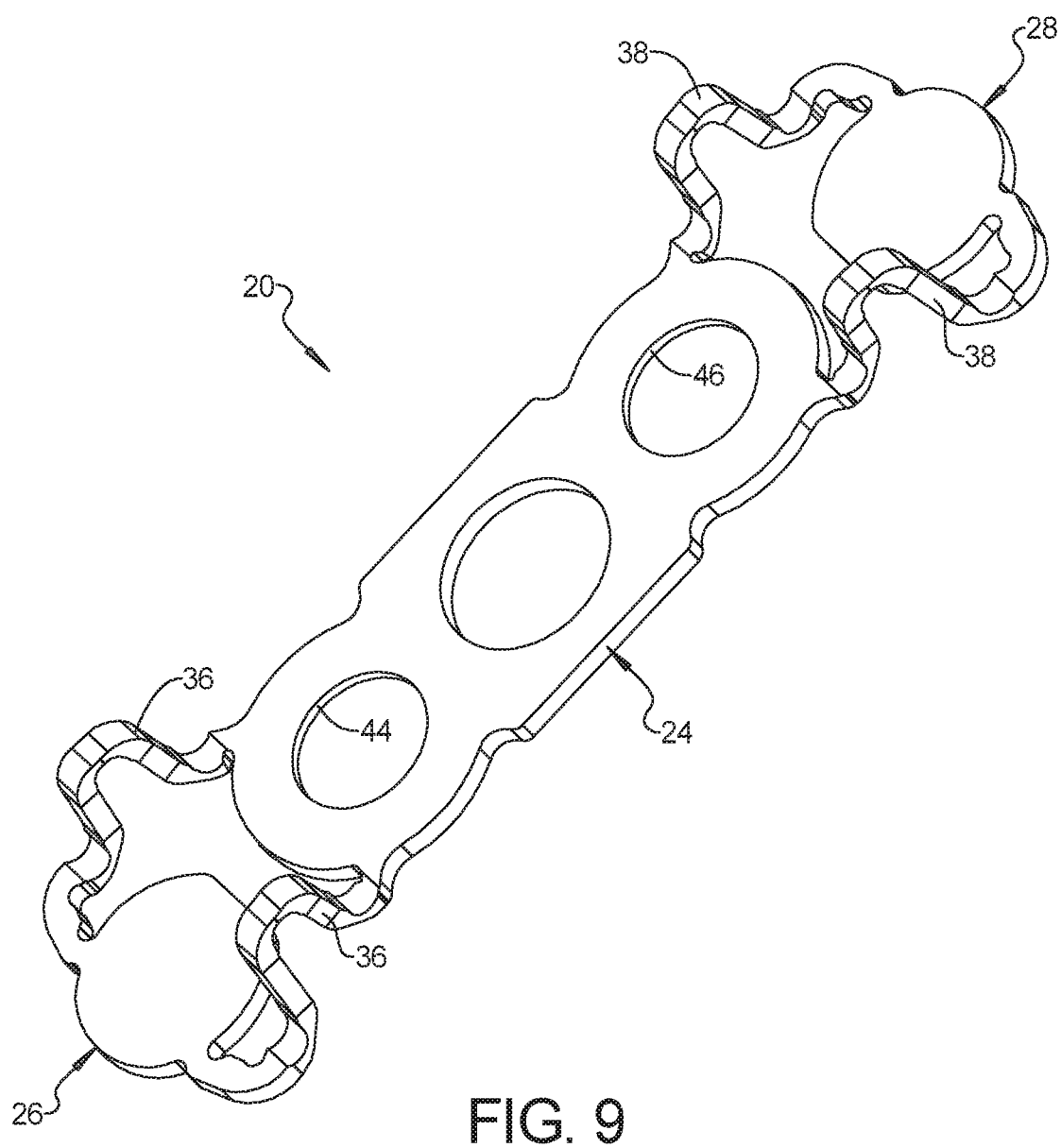
FIG. 9 is a perspective view of the back side of the tapping plate of FIG. 1 shown without clinch nuts.

As shown in FIGS. 1-5 and 9-10, the central member 24, the first attachment pad 26, the second attachment pad 28, the first pair of connecting arms 36 and the second pair of connecting arms 38 can be formed from a single blank of material such that these elements of the tapping plate 20 can have a unitary structure. The central member 24 can be a planar member and can include first and second apertures 44, 46 (FIG. 9). The first nut 32 can be secured to the central member 24 at the first aperture 44 and the second nut 34 can be secured to the central member 24 at the second aperture 46. In the example shown in FIGS. 1-10, the first nut 32 and the second nut 34 can be clinch nuts that can be secured in the first aperture 44 and the second aperture 46 by deforming a pilot of the nut that is inserted through the first aperture 44 or the second aperture 46. The pilot of the nut can be "clinched" around a periphery of the respective aperture as shown in FIG. 5. As will be further described below, other suitable nuts, fasteners or extruded connection points can also be located on the central member 24.

The central member 24 is the portion of the tapping plate 20 to which the striker 42 can be bolted to the bodyside 30 of the vehicle. The central member 24 can include a mounting surface 50 and a back surface 52. The mounting surface 50 of the central member 24 can face the sheet metal of the bodyside 30 and can abut the bodyside 30 when the striker 42 is secured in position. In this position, the central member 24 provides a reinforcement at the striker's location.

As further shown, the central member 24 can have an opening 48 positioned between the first aperture 44 and the second aperture 46. The opening 48 can be used to reduce the overall weight of the tapping plate 20. The opening 48, in this example, can have a circular shape but other shapes can also be used. In other examples, the region of the central member 24 between the first aperture 44 and the second aperture 46 can have other shapes or configurations other than the substantially rectangular shape as shown. For example, the two outer lobes of the central member 24 that support the first nut 32 and the second nut 34 can be connected by a thin strip of material to give the central member 24 a dumbbell shape. In other examples, other shapes can be used.

The first attachment pad 26 can be located at or near the first end 56 of the central member 24. The first attachment pad 26 can be connected to the central member 24 by the first pair of connecting arms 36. The first attachment pad 26 can have a substantially rounded outer profile. In other examples, other shapes or profiles can also be used. The first attachment pad 26 can also include a flat edge 58 on a side of the first attachment pad 26 that is located opposite to the first end 56 of the central member 24.

The flat edge 58 can provide additional clearance between the first attachment pad 26 and the first end 56 of the central member 24 when the tapping plate 20 is in the final installed and/or compressed position. Such clearance permits the central member 24 to be moved a greater distance longitudinally relative to the first attachment pad 26 than would otherwise be possible if the first attachment pad 26 had a rounded profile at the location of the flat edge 58. In other examples, the first attachment pad 26 can be otherwise truncated with different shapes (e.g., with a concave profile) to provide increased clearance between the central member 24 and the first attachment pad 26.

As can be appreciated, there may be limited room in a bodyside 30 or in the B-pillar or C-pillar to which the tapping plate 20 may be attached. In such circumstances with limited packaging space, the clearance provided by the flat edge 58 (or other clearance formation) can result in a suitable amount of adjustment to be allowed by the tapping plate.

The first attachment pad 26 is sufficiently sized so as to allow the first attachment pad 26 to be connected to a mating surface such as a bodyside 30 of a vehicle. In the example shown, the first attachment pad 26 is sized so that the first attachment pad 26 can be spot welded to the bodyside 30. In other examples, the first attachment pad 26 can be attached to a mating surface using other welding methods or can be attached using fasteners, staking, adhesive or the like. Such alternate examples may include the addition of a projection to the first attachment pad 26 and/or the second attachment pad 28 to allow the attachment pad(s) to be connected via projection welding. The first attachment pad 26 includes an attachment surface 54. The attachment surface 54 is the surface of the first attachment pad 26 that is positioned adjacent to or abutting the bodyside 30 or other mating surface.

The second attachment pad 28 can have a substantially similar shape and profile to that of the first attachment pad 26 and is not described again for the sake of brevity. The second attachment pad 28 can be shaped and oriented symmetrically opposite to the first attachment pad 26 about a center of the central member 24. The second attachment pad 28 can be positioned at or near a second end 60 of the central member 24. The second attachment pad 28 can be connected to the central member 24 by the second pair of connecting arms 38.

The first pair of connecting arms 36 and the second pair of connecting arms 38, like the first attachment pad 26 and the second attachment pad 28, can be substantially similar to one another and have similar shapes, profiles and locations that are symmetrically opposite to one another at opposite ends of the central member 24. For the sake of brevity, the first pair of connecting arms 36 is described below.

Each of the connecting arms 36 is connected between the central member 24 and the first attachment pad 26. Each connecting arm 36 can be connected to the central member 24 at a central end 64 and to the first attachment pad 26 at a pad end 66. In the example shown, the central end 64 of each connecting arm 36 is positioned on a lateral side of the central member 24 and/or away from the first end 56. In this manner, the connecting arms 36 are positioned away from the flat edge 58 of the first attachment pad 26 and away from the first end 56 of the central member 24 so as to not interfere or restrict the central member 24 from moving relative to the first attachment pad 26. In other examples, the central end 64 can be positioned further laterally outward on the lateral sides of the central member 24 and/or at a position that is further away from the first end 56 in a longitudinal direction on the central member 24 (i.e., closer to a center of the central member 24).

The opposite or pad end 66 of each connecting arm 36 is connected at a lateral position on the periphery of the first attachment pad 26 so as to not interfere with relative movement between the central member 24 and the first attachment pad 26. As further shown, each one of the pair of connecting arms 36 are connected at opposite lateral sides of the first attachment pad 26 and the central member 24.

As further shown, in this example, each of the connecting arms 36 can include an arched portion 70 and a lateral extension 72. The arched portion 70 can project upward in a direction generally away from the attachment surface 54 and the mounting surface 50 of the first attachment pad 26 and the central member 24, respectively. Generally speaking, the arched portion 70 can extend away from the central member 24 and the first attachment pad 26 such that an apex or top 76 of the arched portion 70 can be located at a height H above the attachment surface 54 (FIG. 5). The height H can position the apex 76 of the arched portion 70 above the mounting surface 50 and above the first nut 32. In other examples, the apex 76 can be positioned at other heights relative to the attachment surface 54. The height H is preferably sized in order to permit an operator, as will be further described below, to adjust the location of the central member 24 relative to the first attachment pad 26 by deforming one or more of the connecting arms 36, 38. As can be appreciated, when a force is transferred to the arched portion 70 from the central member 24 at or near the central end 64, the height H of the apex 76 can affect the force required to cause plastic deformation at the apex 76.

Figure 4:
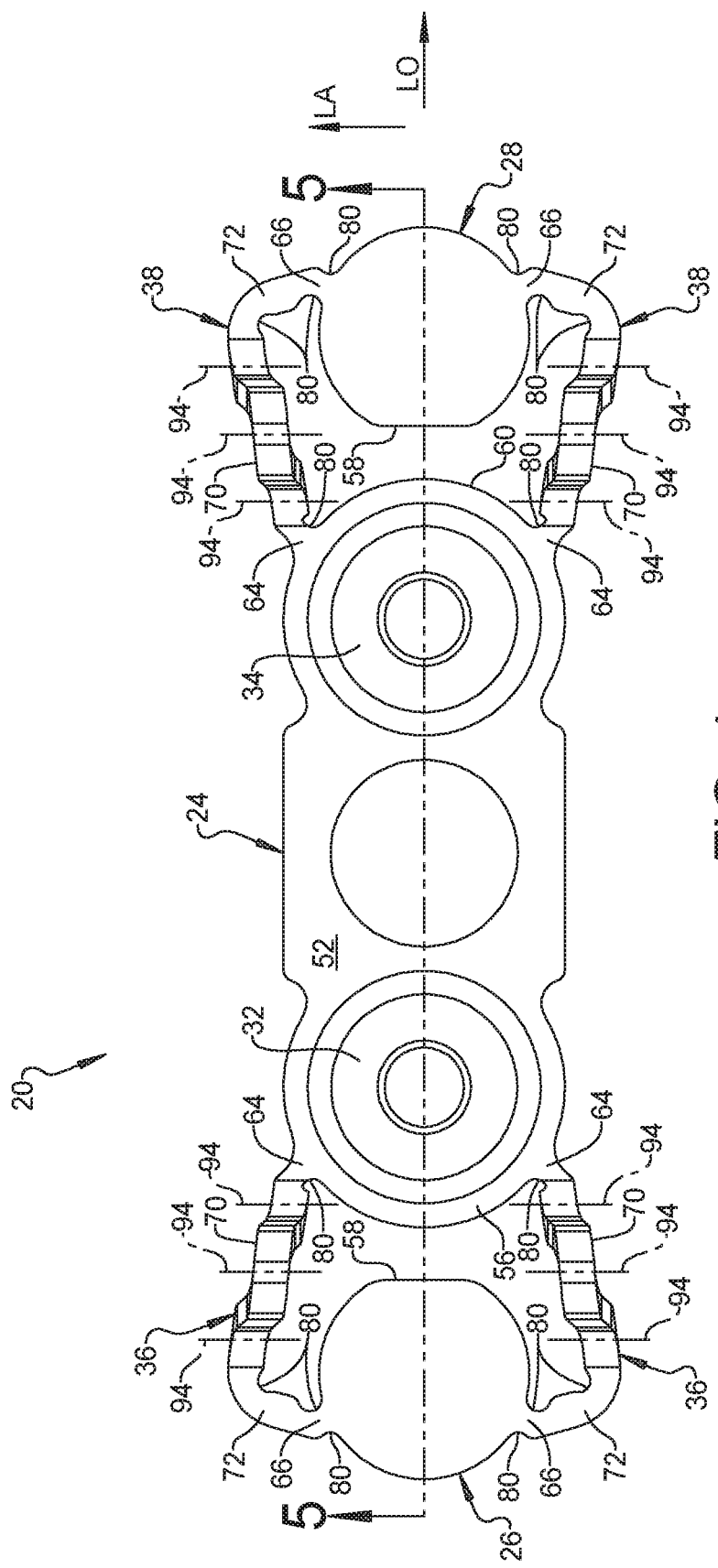
FIG. 4 is a plan view of the tapping plate of FIG. 1.

As can be seen in FIG. 4, the arched portion 70 of each connecting arm 36 can be angled laterally outward relative to a longitudinal center line of the central member 24. The arched portion 70 can extend in a plane that is perpendicular to the mounting plane 102 and attachment plane 100. The lateral extension 72 can be a portion of each connecting arm 36 that extends laterally inward from the distal end of the arched portion 70 to connect the connecting arm 36 to the first attachment pad 26 at the pad end 66. The lateral extension 72 can extend in a plane that is parallel to the mounting plane 102 and attachment plane 100. Thus, thinned sections (e.g., 84, 86, 88) in the arched portion 70 can primarily facilitate longitudinal movement of the openings 44, 46 and threaded nuts 32, 34 relative to the attachment pads 26, 28, and thinned sections 80 in the lateral extensions can primarily facilitate lateral movement of the openings 44, 46 and threaded nuts 32, 34 relative to the attachment pads 26, 28.

Each of the connecting arms 36 can include one or more deformation inducement locations that are positioned along the connecting arms to induce plastic deformation to allow the central member 24 to move relative to the first attachment pad 26 and/or the second attachment pad 28. Such deformation inducement locations can include notches 80 that can be positioned along the connecting arm 36. In the example shown, the connecting arms 36 can include notches 80 at or near the central end 64. The notches 80 can generally have various shapes such as a concave rounded shape that reduces a width and/or thickness of the connecting arm 36 locally relative to the adjacent portions of the connecting arm 36.

The notches 80 can have a thickness measured in a direction substantially parallel to the attachment plane 100. In other words, the notches 80 can be thinned, or can have thicknesses that extend, in a direction that is parallel to the attachment and mounting planes, or to the attachment and mounting surfaces 54 and 50, respectively. In other examples, however, the notches 80 can have a reduced thickness (or width) that is measured in a direction substantially perpendicular to the adjustment plane. As can be appreciated, such notches 80 can be formed when the blank of the tapping plate 20 is formed. During such stamping or other suitable process, material at the location of the notches 80 can be removed to create the areas of reduced thickness or width. In other examples, the notches 80 can be formed during other processing steps of the tapping plate 20. At the notches 80, the cross-sectional area of the connecting arms 36, 38 can be reduced creating the deformation inducement locations.

The notches 80 can have a suitable size so as to allow plastic deformation to occur in the resulting reduced cross-sectional portions when a predetermined force is applied to the central member 24. In one example, the notches 80 are sized to cause the thickness of the connecting arm 36 at the notch 80 to be one-half of the thickness of the connecting arm 36 at adjacent portions. In another example, the notches 80 are sized to cause the thickness of the connecting arm 36 to be less than the thickness of adjacent portions of the connecting arm 36 and greater than one-half the thickness of the adjacent portions. In other examples, the notches 80 can have other sizes to create other relative thicknesses of the notched sections of the connecting arms 36. In other examples, the notches 80 can have cross-sectional areas that have the same or similar relative sizes to the cross-sectional areas of adjacent portions of the connecting arm 36 as that described above for the thicknesses of the notches 80.

As can be appreciated, the notches 80 can cause the connecting arm 36 to deform at these localized weakened regions. In addition to the notches 80 at or near the central end 64, notches 80 can also be located at or near the pad end 66 and/or at or near the intersection of the arched portion 70 and the lateral extension 72. In other examples, the connecting arms 36 can have notches 80 at other locations and can have notches 80 of different shapes, such as V-shaped or the like.

Figure 2:
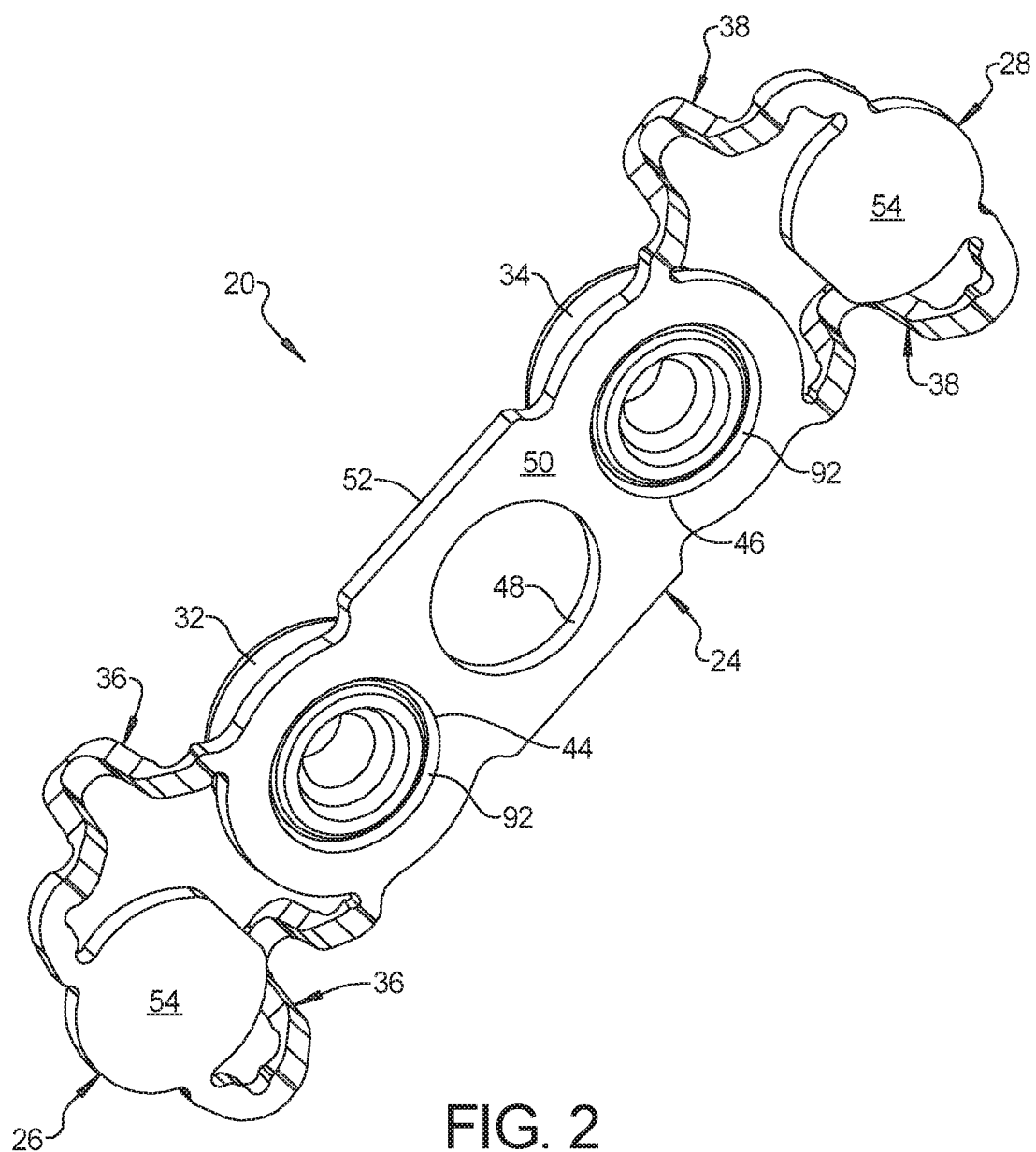
FIG. 2 is a perspective view of a mounting side of the tapping plate of FIG. 1.

Each of the connecting arms 36 can also include a deformation inducement location that has the form of a narrowed or thinned section. Such thinned sections can be portions of the connecting arm 36 that have a thickness that is thinner than adjacent portions of the connecting arm. The thinned sections can have a cross-sectional area that is less than the cross-sectional area of adjacent sections of the connecting arm 36. In other examples, the thickness of the connecting arm 36 can be narrowed or thinned in one direction but be relatively larger in a second (e.g., perpendicular direction). Such narrowed or thinned sections can be positioned at various locations along the connecting arms 36 to induce plastic deformation of the connecting arm 36 to allow the central member 24 to be moved relative to the first attachment pad 26 and/or the second attachment pad 28. As shown in FIGS. 1 and 2, the connecting arm 36 can have a first narrowed section 84 positioned at or near the apex 76. The connecting arm 36 can also have a second narrowed section 86 and a third narrowed section 88 positioned at opposite ends of the arched portion 70.

In the example shown, the connecting arm 36 is thinned at the first, second and third narrowed sections 84, 86, 88 in a direction substantially perpendicular to the attachment surface 54 and/or the mounting surface 50. In other words, the first, second and third narrowed sections 84, 86, 88 can each be thinned, or can have thicknesses that extend, in a direction parallel to a plane perpendicular to the attachment and mounting planes, or to the attachment and mounting surfaces 54 and 50, respectively. In other examples, the narrowed sections 84, 86, 88 or other deformation inducement locations can be thinned in alternate directions such in the lateral or the longitudinal directions.

The narrowed sections 84, 86, 88 can have various sizes to cause the previously described plastic deformation to occur when a predetermined force is applied to the central member 24. In one example, the narrowed sections 84, 86, 88 can have a thickness that is less than one-half of the thickness of the adjacent portions of the connecting arm 36. In another example, the narrowed sections 84, 86, 88 have thickness that can be greater than one-half of but less than the thickness of adjacent portions of the connecting arm 36. In still other examples, the narrowed sections 84, 86, 88 can have other shapes to result in other relative sizing of the thickness of the connecting arm 36. The relative size of the cross-sectional areas of the connecting arm 36 at the narrowed sections 84, 86, 88 can have the same or similar relative sizes to the cross-sectional area of adjacent portions of the connecting arms 36. For example, the cross-sectional area of the connecting arm 36 at the narrowed sections 84, 86, 88 can be less than one-half or greater than one-half of but less than the cross-sectional area of the adjacent portions of the connecting arm 36. In other examples, the relative size of the cross-sectional area of the connecting arm 36 at the narrowed sections 84, 86, 88 to the cross-sectional area of adjacent portions of the connecting arm 36 can have other sizing.

The narrowed sections 84, 86, 88 can be created in the connecting arms 36 any suitable manner. In one example, the narrowed sections 84, 86, 88 can be created during a coining operation. In addition to the narrowed sections, the coining operation can also be used to form recesses 92 in the mounting surface 50 at the first aperture 44 and/or the second aperture 46.

Figure 10:
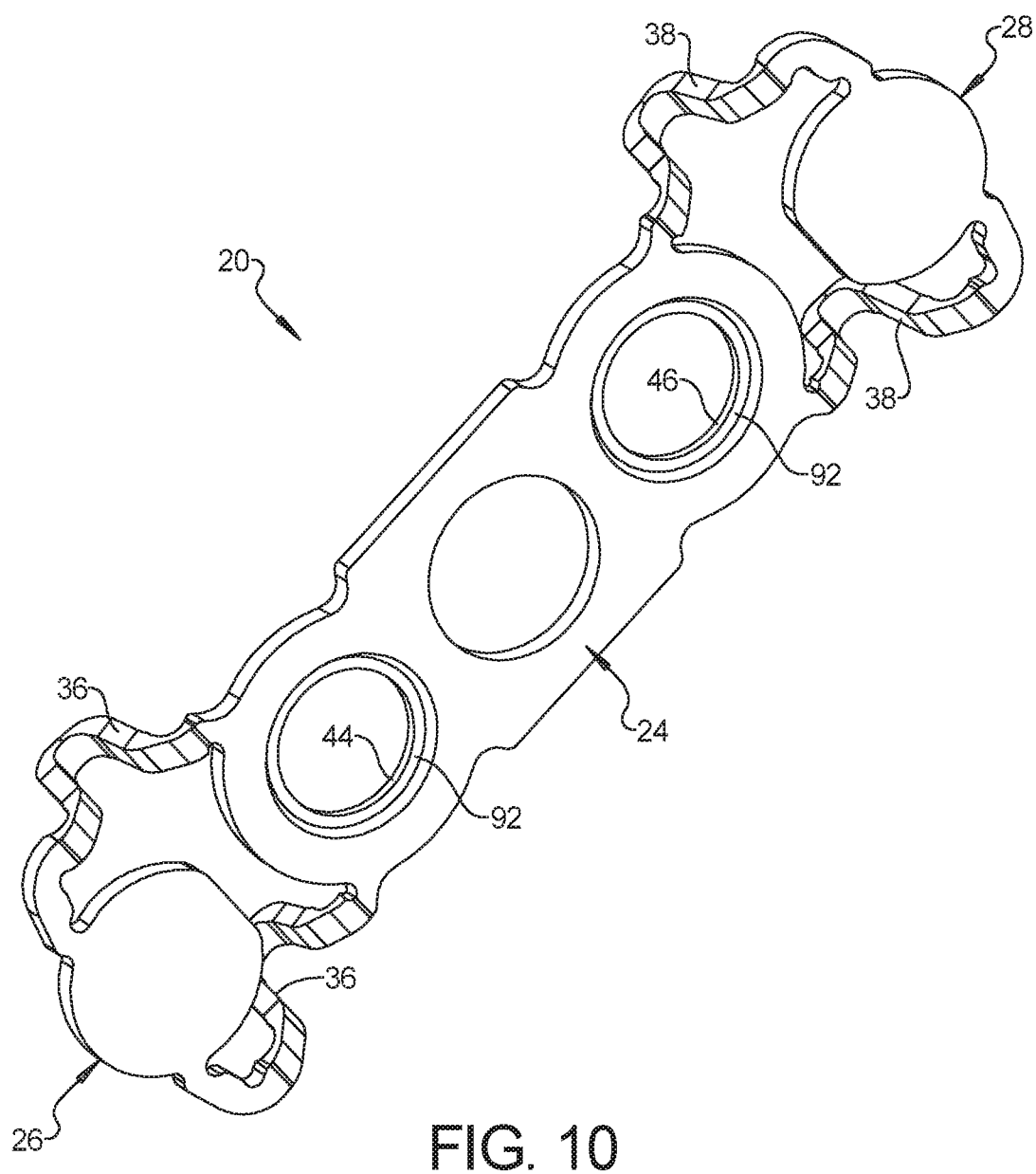
FIG. 10 is a perspective view of the mounting side of the tapping plate of FIG. 1 shown without clinch nuts.

As shown in FIG. 10, the recesses 92 can be depressions positioned around the circumference of the first aperture 44 and the second aperture 46. The recesses 92 can be included in the central member 24 so that the clinched portions of the first nut 32 and/or the second nut 34 do not project outward beyond the mounting surface 50 of the central member 24 (see FIG. 5). In this manner, the mounting surface 50 can be positioned flushly against the bodyside 30 (or other mating surface). In other examples, other processes can be used to create the narrowed sections 84, 86, 88 and/or the recesses 92 such as embossing, milling, grinding or the like.

The connecting arms 36 can be formed using any suitable forming technique. In the example shown, the connecting arms 36 can be formed using a draw process. In such a process, the blank is held at or near the central member 24 and the first attachment pad 26 and the second attachment pad 28 are drawn longitudinally inward toward the central member 24 while the connecting arms 36, 38 are formed into the arched shapes as previously described. In order to effectively use such a draw process, the connecting arms 36, 38 have shapes in which the corners of the connecting arms 36, 38 have axes that are positioned perpendicular to the longitudinal direction of the tapping plate 20. As shown in FIG. 4, the center axes 94 of the corners of the connecting arm 36 (at the apex 76 and at the base of the arched portion 70) extend in a direction substantially perpendicular to the longitudinal direction. It is desirable to use a draw process for the forming of the tapping plate 20 in order to reduce the amount of processing required and/or to reduce the manufacturing cost.

Figure 3:
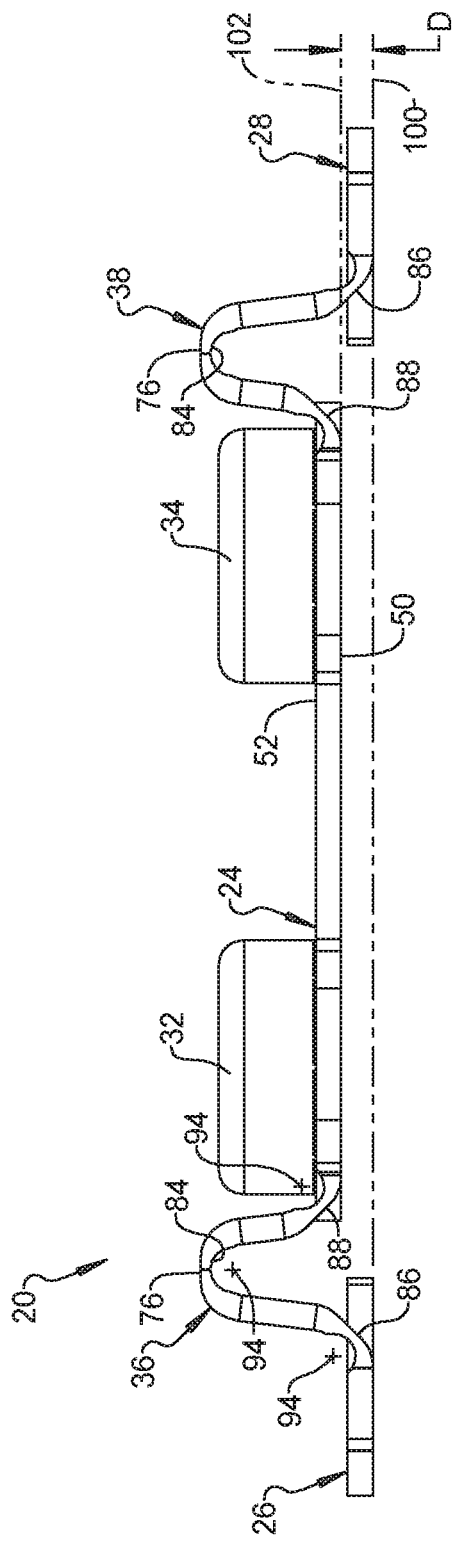
FIG. 3 is a side elevation view of the tapping plate of FIG. 1.

As also shown in FIGS. 3 and 5, the tapping plate 20 can have an offset design in which the central member 24 is offset from the first attachment pad 26 and/or the second attachment pad 28. In the example shown, the attachment surfaces 54 of the first attachment pad 26 and the second attachment pad 28 can aligned to define an attachment plane 100. The mounting surface 50 of the central member 24 can define a mounting plane 102. The attachment plane 100 and the mounting plane 102 can be oriented substantially parallel to one another and be positioned offset from one another by an offset distance D. The connecting arms 36, 38 can be formed to position the mounting plane 102 at a desired offset distance D relative to the attachment plane 100.

In one example, the offset distance D can be the same as a thickness of the first attachment pad 26 and/or the second attachment pad 28. In another example, the offset distance D can be greater than 1× the thickness of the first attachment pad 26 and/or the second attachment pad 28 but less than 2× the thickness of the first attachment pad 26 and/or the second attachment pad 28. In still another example, the offset distance D is greater than zero but less than the thickness of the first attachment pad 26 and/or the second attachment pad 28. In yet another example, the offset distance D is greater than 2× the thickness of the first attachment pad 26 and/or the second attachment pad 28.

The offset configuration of the tapping plate 20 allows the tapping plate 20 and the surrounding mating surfaces to which it is attached to be fully and independently covered during the e-coating process. The tapping plate 20 can be welded or otherwise fixed to a bodyside 30 or other mating surface during assembly of a vehicle body prior to e-coating and painting. The tapping plate 20, therefore, undergoes the e-coating and painting process. In existing tapping plate designs, the tapping plate can be positioned adjacent to the mating surface. In such circumstances, the e-coating material can be deposited over the tapping plate and at the edges of the adjacent surfaces of the tapping plate and the mating surface. When this occurs, the tapping plate can be become "glued" to the mating surface by the e-coat material. Such circumstances, called "hydraulic locking," present problems because it can be difficult to separate the tapping plate from the mating surface such that adjustment of the tapping plate and/or the striker during final assembly is difficult or requires significant force. In addition, if the tapping plate is separated from the mating surface, the underlying mating surface and/or the mounting surface of the tapping plate may not have sufficient coverage of the e-coat material. Without proper e-coat material, the uncoated or insufficiently coated surfaces can be susceptible to corrosion.

In the tapping plates of the present disclosure, the offset distance D provides sufficient clearance between the mounting surface 50 of the central member 24 and the mating surface of the bodyside 30 (or other structure). When the tapping plate 20 is initially installed, the first attachment pad 26 and the second attachment pad 28 are positioned against the mating surface of the bodyside 30. The mounting surface 50 of the central member 24 is spaced apart from the bodyside 30 by the offset distance D. In this installed position, e-coat material can be deposited on the tapping plate 20 and on the mating surface of the bodyside 30 to sufficiently protect both surfaces from corrosion (FIG. 5).

When the striker 42 is assembled to the bodyside 30, bolts 104 are inserted through the striker 42 and into the first nut 32 and the second nut 34. The bolts 104 can then be torqued to secure the striker 42 to the bodyside 30. When the bolts 104 are driven into the first nut 32 and the second nut 34, such action can cause the central member 24 to be pulled in a direction toward the attachment plane 100 until the mounting plane 102 is substantially aligned with the attachment plane 100. The mounting surface 50 can be positioned against the mating inner surface of the bodyside 30. In this final installed or compressed state, the shape of the tapping plate 20 has changed from the initial installed state to cause the offset distance D to be at or near zero.

Figure 6:
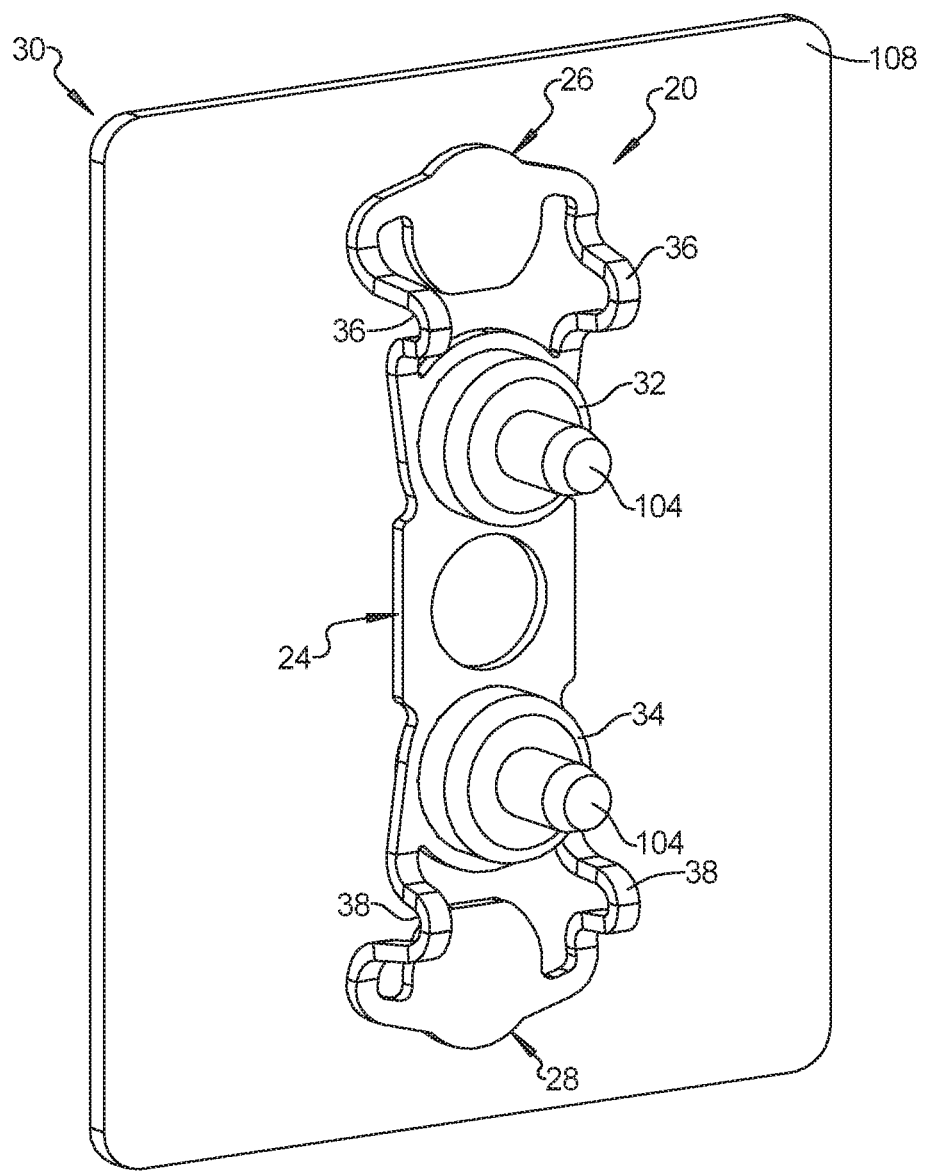
FIG. 6 is a perspective view of the tapping plate of FIG. 1 assembled to a panel showing the tapping plate in an installed position.
Figure 7:
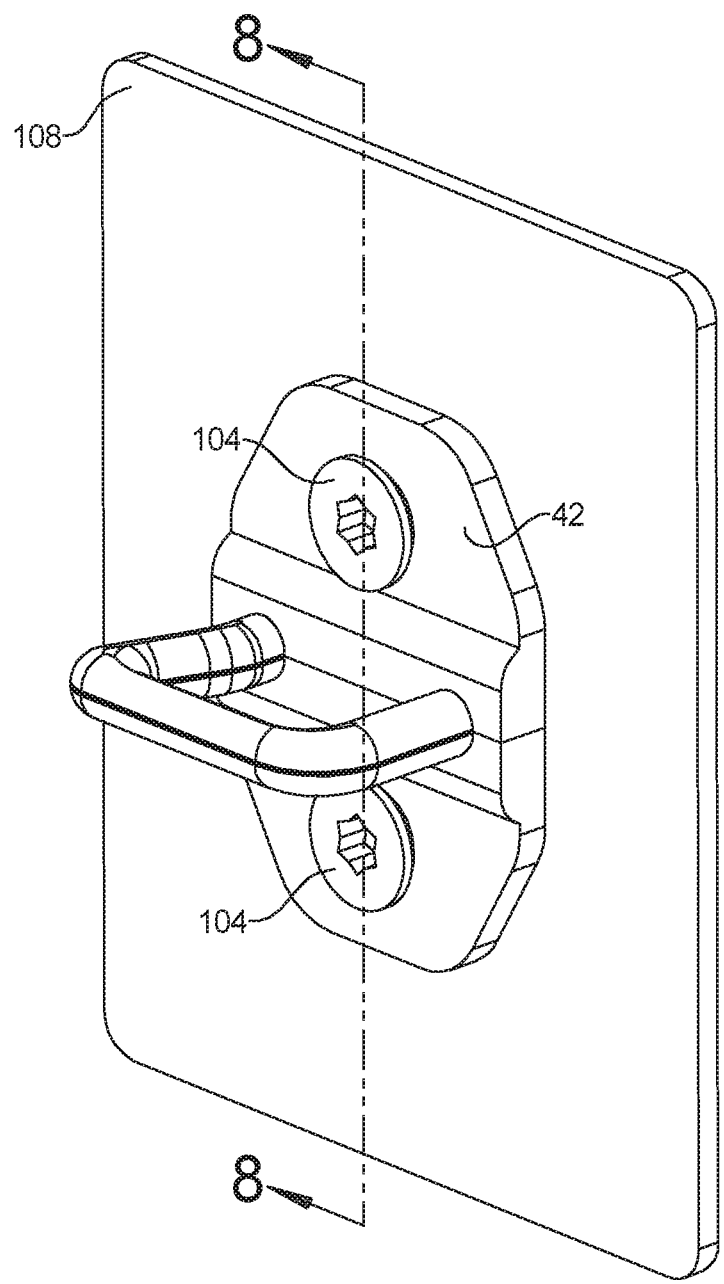
FIG. 7 is a front perspective view of the panel of FIG. 6 showing a striker secured to the panel.

As shown in FIGS. 6-8, the example tapping plate 20 is shown attached to the bodyside 30 with the striker 42 secured to the tapping plate 20. In the example shown, the tapping plate 20 is in the final installed or compressed state. As shown, the bodyside 30 is illustrated as a panel 108. The panel is illustrated as a rectangular piece of material for illustration purposes only. As can be appreciated, the panel 108 can be any suitable mating surface of the bodyside 30 such as a B-pillar, C-pillar or other element of a vehicle body. As shown in FIG. 8, the mounting surface 50 is positioned against the inner mating surface 110 of the panel 108. The striker 42 can be positioned on the opposite surface of the panel 108.

During assembly, the position of the striker 42 can be adjusted as needed. The striker 42 can first be torqued to an initial "soft" torque level that can cause the striker 42 to be secured to the tapping plate 20 but also allows for the central member 24 to be moved relative to the first attachment pad 26 and/or the second attachment pad 28. After the striker 42 is initially installed, an operator on the assembly line can check the alignment of the door latch to the striker 42. If there is a misalignment that requires correction, the operator can apply a force to the striker 42. Such force can be applied by hitting the striker 42 with a mallet, for example. The alignment of the door latch and the striker 42 can be re-checked and further adjustments can be made iteratively as necessary until an acceptable alignment between the striker 42 and the door latch is achieved. Once an acceptable alignment is achieved, the bolts 104 can be torqued to a final "hard" torque level. At the final "hard" torque level, the frictional force between the tapping plate 20 and the mating surface maintains the tapping plate 20 and the striker 42 in the desired and aligned position.

When the operator is adjusting the striker 42 as previously described, the central member 24 of the tapping plate 20 can move relative to the first attachment pad 26 and/or the second attachment pad 28. One or more of the connecting arms 36, 38 can plastically deform and allow such relative movement. Such plastic deformation can occur at one or more of the deformation inducement locations such as the notches 80 and/or one or more of the narrowed sections 84, 86, 88. In other words, each of the deformation inducement locations can have a thickness that is designed to plastically deform the material at each of these deformation inducement locations, and avoid springback in the connecting arms.

In existing tapping plates, one or more portions of the tapping plates may allow for relative movement but often suffer from many disadvantages. One such disadvantage is that existing designs may require significant forces to adjust the striker's location. Such significant forces can result in misalignments between strikers and door latches. Another disadvantage of existing designs is that spring back can occur. If the tapping plate does not undergo plastic deformation, the tapping plate may have a tendency to return to an original position (prior to the final torque being applied by the operator). Such spring back can result in misalignments. Also, existing tapping plates can cause a striker to twist during adjustment. Existing tapping plates can have structures that can require different adjustment forces to be applied in the lateral and longitudinal directions. When such non-symmetrical adjustment forces are required to adjust the striker, it can be difficult for an operator to accurately and consistently adjust a striker since different forces need to be applied in different directions. When such circumstances exist, it is often the case that a striker will be twisted or otherwise misaligned with a door latch.

The tapping plates of the present disclosure are improvements over existing designs and address each of the foregoing disadvantages. The force required to move the central member 24 can be set a predetermined and acceptable level. The height H of the arched portion 70 and the sizes and locations of the notches 80 and the narrowed sections 84, 86, 88 can be tuned to achieve a desired adjustment force. In addition, such features of the tapping plate 20 can also be adjusted such that connecting arms 36, 38 undergo plastic deformation during adjustment. When such deformation occurs, the central member 24 will not spring back to an original position prior to final torqueing of the striker 42 into the final position. Additionally, the connecting arms 36, 38 can be positioned and sized accordingly as previously described to result in symmetrical adjustment forces to be necessary to deform the connecting arms 36, 38 in both the lateral and longitudinal directions.

As previously described, the first nut 32 and the second nut 34 can be clinch nuts. In other examples, the first nut 32 and the second nut 34 can be weld nuts or the central member 24 can include an extruded tappable cylinder at the first aperture 44 and/or the second aperture 46. In addition, the first nut 32 and/or the second nut 34 can include a prevailing torque feature. A mechanically-connected nut, however, can be advantageous in some circumstances. Such nuts can have properties that are independent of the material of the central member 24 (e.g., strength, torque, corrosion resistance).

Figure 11:
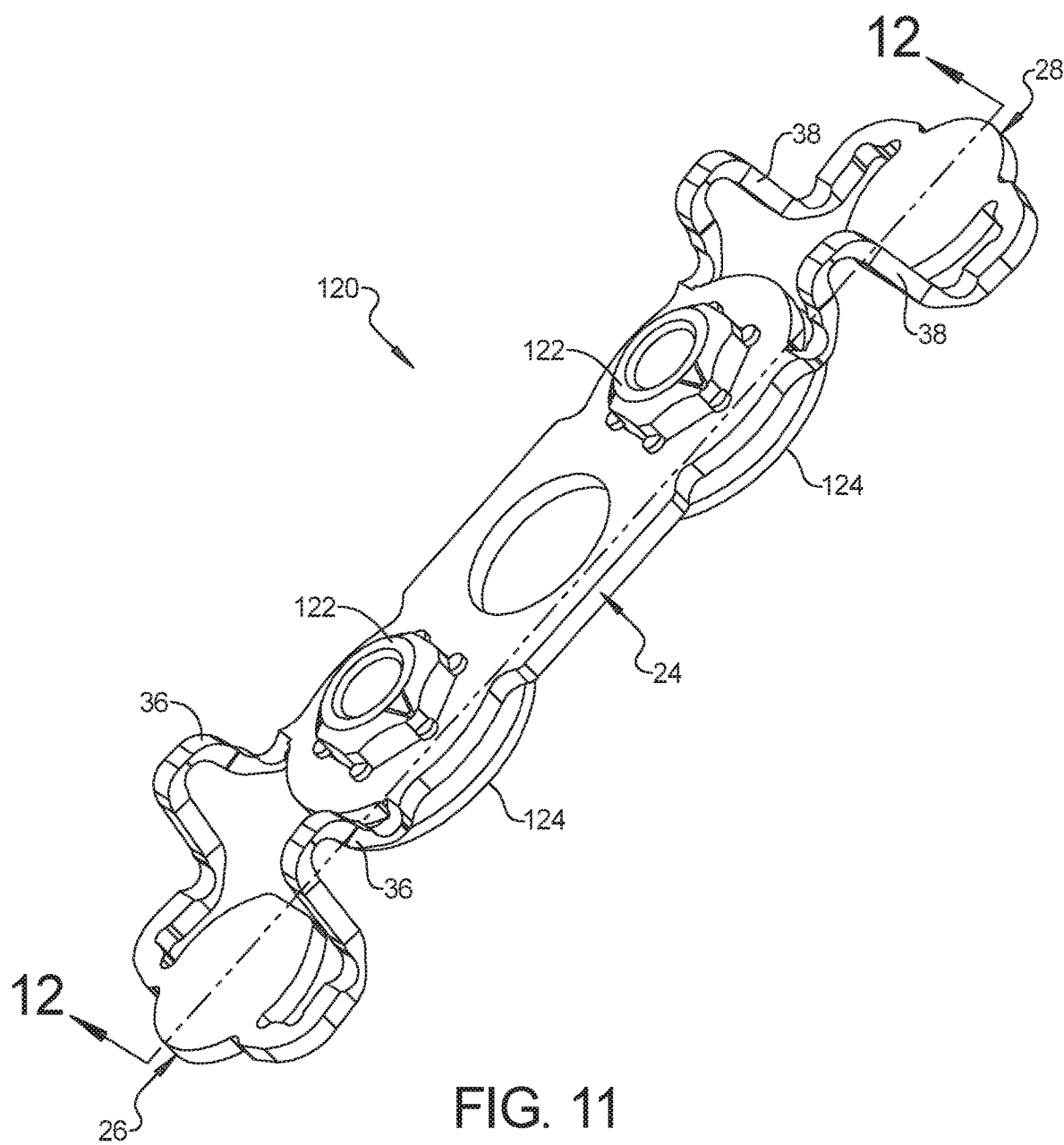
FIG. 11 is a perspective view on another example tapping plate in accordance with the present disclosure.
Figure 12:
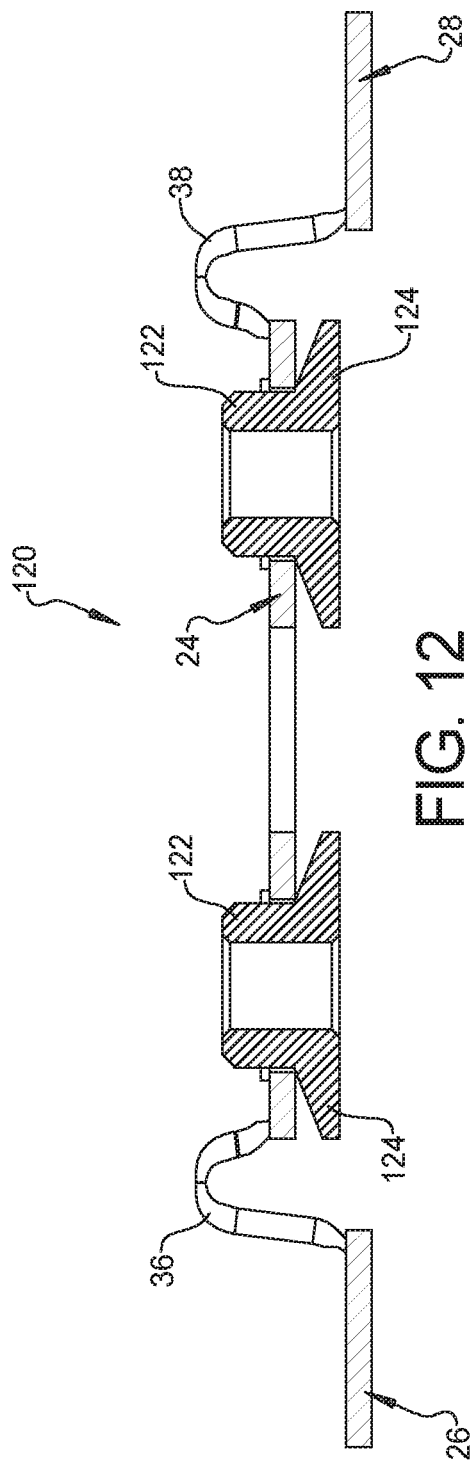
FIG. 12 is a side sectional view of the tapping plate of FIG. 11 shown along the cutting plane indicated on FIG. 11.

In another example tapping plate shown in FIGS. 11 and 12, a tapping plate 120 includes staking nuts rather than the clinch nuts shown in tapping plate 20. The tapping plate 120 can be similar to the tapping plate 20 in most respects. The tapping plate 120, however, includes hexagonally shaped apertures in the central member 24. The staking nuts 122 can be inserted through the hexagonally shaped apertures and then staked into position using suitable joining techniques. The staking nuts 122 can include a flared mounting surface 124 that extends below the mounting surface 50 of the central member 24. Thus, when the striker (not shown) is secured to the tapping plate 120, the flared mounting surfaces 124 of the staking nuts 122 can be pulled against the mating surface of the bodyside 30 or other mating structure.

Figure 13:
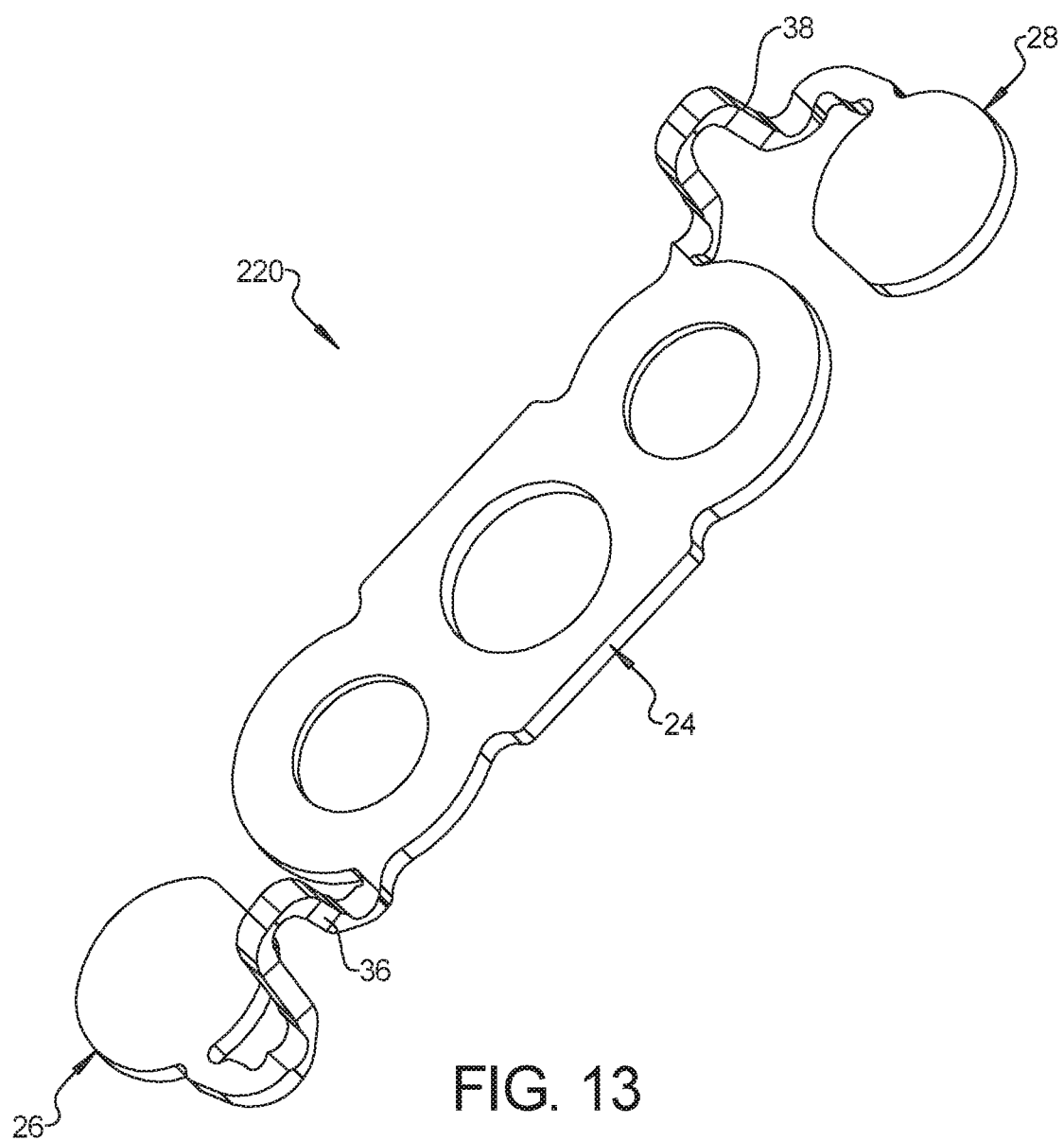
FIG. 13 is a perspective view of another example tapping plate in accordance with the present disclosure.

Referring now to FIG. 13, another example tapping plate 220 is shown. In this example, the tapping plate 220 (shown without the first nut 32 and the second nut 34) is the same or similar to the tapping plate 20 previously described. In this example, however, the first attachment pad 26 can be joined to the central member 24 by a single connecting arm 36. The second attachment pad 28 can similarly be joined to the central member 24 by a single connecting arm 38. In other example tapping plates, other variations of the tapping plate 20 can also be used. In such other examples (not shown), the tapping plate 20 may only have a single attachment pad positioned on one end of the central member 24. In such asymmetrical examples, the connecting arm can be connected at or near the center of the central member 24. Such central attachment location can result in symmetrical adjustment forces to be required to move the central member 24 during the adjustment of the striker 42.

While the examples described above generally describe use of the tapping plates of the present disclosure in the context of a vehicle door striker, the tapping plates and the teachings and principles of the present disclosure can be applied in other suitable applications. Such alternate applications can include, without limitation, in vehicle hoods, vehicle liftgates, vehicle trunk lids, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A deformable tapping plate comprising:
a central member including at least two mounting openings and a mounting surface, the mounting surface defining a mounting plane;
a first attachment pad located adjacent a first end of the central member and connected to the central member by a first connecting arm, the first attachment pad including a first attachment surface; and
a second attachment pad located adjacent to a second end of the central member opposite to the first attachment pad and connected to the central member by a second connecting arm, the second attachment pad including a second attachment surface oriented co-planar with the first attachment surface to define an attachment plane, wherein the mounting plane and the attachment plane are oriented substantially parallel to one another with the mounting plane offset from the attachment plane,
the first connecting arm including a first arched portion projecting away from both the mounting plane and the attachment plane and including a first narrowed apex having a thickness that is less than a thickness of an adjacent portion of the first arched portion, and
the second connecting arm including a second arched portion projecting away from both the mounting plane and the attachment plane and including a second narrowed apex having a thickness that is less than a thickness of an adjacent portion of the second arched portion, wherein a single continuous sheet of metal forms each of the first and second attachment pads, the first and second connecting arms, and at least a portion of the central member.

2. The deformable tapping plate of claim 1, wherein the first and second connecting arms each include a notched section therein that has a thickness that is less than a thickness of an adjacent portion of the first and second connecting arms, respectively.

3. The deformable tapping plate of claim 2, wherein the thickness of each pair of notched sections each extends in a direction that is parallel to the attachment and mounting planes.

4. The deformable tapping plate of claim 1, wherein the first and second connecting arms each include a lateral extension connected to one end of the first and second arched portions, respectively.

5. The deformable tapping plate of claim 4, wherein the lateral extension of each of the first and second connecting arms includes a notched section that has a thickness that is less than a thickness of an adjacent portion of the lateral extension of the first and second connecting arms, respectively.

6. The deformable tapping plate of claim 1, wherein the at least two mounting openings of the central member are formed in the single continuous sheet of metal and a threaded nut is mounted in each of the mounting openings.

7. The deformable tapping plate of claim 6, wherein the threaded nuts of the central member provide the mounting surface that defines the mounting plane.

8. The deformable tapping plate of claim 6, wherein the single continuous sheet of metal provides the mounting surface that defines the mounting plane of the central member.

9. The deformable tapping plate of claim 6, wherein each of the threaded nuts is a clinch nut.

10. The deformable tapping plate of claim 6, wherein each of the threaded nuts is a staking nut.

11. A deformable tapping plate comprising:
a central member including at least two mounting openings and a mounting surface, the mounting surface defining a mounting plane;
a first attachment pad located adjacent a first end of the central member and connected to the central member by a first connecting arm, the first attachment pad including a first attachment surface; and
a second attachment pad located adjacent to a second end of the central member opposite to the first attachment pad and connected to the central member by a second connecting arm, the second attachment pad including a second attachment surface oriented co-planar with the first attachment surface to define an attachment plane,
the first connecting arm including a first arched portion projecting away from both the mounting plane and the attachment plane and including a first narrowed apex having a thickness that is less than a thickness of an adjacent portion of the first arched portion, and
the second connecting arm including a second arched portion projecting away from both the mounting plane and the attachment plane and including a second narrowed apex having a thickness that is less than a thickness of an adjacent portion of the second arched portion,
wherein a single continuous sheet of metal forms each of the first and second attachment pads, the first and second connecting arms, and at least a portion of the central member, and
wherein the first and second arched portions each include an additional pair of narrowed sections at or near opposite ends of the first and second arched portions, respectively, each additional pair of narrowed sections having a thickness that is less than a thickness of an adjacent portion of the first and the second arched portions, respectively.

12. The deformable tapping plate of claim 11, wherein the thickness of the first apex, the second apex, and each additional pair of narrowed sections extends in a direction parallel to a plane that is perpendicular to the attachment and mounting planes.

13. A deformable tapping plate comprising:
a central member including at least two mounting openings and a mounting surface, the mounting surface defining a mounting plane; and
a first attachment pad located adjacent a first end of the central member and connected to the central member by a first pair of connecting arms, the first attachment pad including a first attachment surface; and
a second attachment pad located adjacent to a second end of the central member opposite to the first attachment pad and connected to the central member by a second pair of connecting arms, the second attachment pad including a second attachment surface oriented substantially co-planar with the first attachment surface to define an attachment plane;
the first pair of connecting arms each including a first arched portion projecting away from both the mounting plane and the attachment plane and including a first narrowed apex having a thickness that is less than a thickness of an adjacent portion of the first arched portion, and each of the first pair of connecting arms including a first lateral extension connected to one end of the first arched portion with the first lateral extension including a first notched section having a thickness that is less than a thickness of an adjacent portion of the first lateral extension; and
the second pair of connecting arms each including a second arched portion projecting away from both the mounting plane and the attachment plane and including a second narrowed apex having a thickness that is less than a thickness of an adjacent portion of the second arched portion, and each of the second pair of connecting arms including a second lateral extension connected to one end of the second arched portion with the second lateral extension including a second notched section having a thickness that is less than a thickness of an adjacent portion of the second lateral extension;
wherein a single continuous sheet of metal forms each of the first and second attachment pads, the first and second connecting arms, and at least a portion of the central member.

14. The deformable tapping plate of claim 13, wherein the first pair of connecting arms are connected to the first attachment pad on opposite lateral sides of the first attachment pad, and the second pair of connecting arms are connected to the second attachment pad on opposite lateral sides of the second attachment pad.

15. The deformable tapping plate of claim 13, wherein the thickness of each first and second narrowed apex extends in a direction parallel to a plane that is perpendicular to the attachment and mounting planes, and the thickness of each first and second notched sections extends in a direction that is parallel to the attachment and mounting planes.

16. The deformable tapping plate of claim 13, wherein each arched portion of the first and second pairs of connecting arms includes an additional pair of narrowed sections having a thickness that is less than a thickness of an adjacent portion of the connecting arm at or near opposite ends of the first and second arched portions, respectively, and each lateral extension of the first and second pairs of connecting arms includes an additional notched section having a thickness that is less than a thickness of an adjacent portion of the connecting arm.

17. The deformable tapping plate of claim 16, wherein the thickness of each first and second narrowed apex and the pairs of narrowed sections of the arched portions extends in a direction parallel to a plane that is perpendicular to the attachment and mounting planes, and the thickness of each first and second notched sections and additional notched sections extends in a direction that is parallel to the attachment and mounting planes.

18. The deformable tapping plate of claim 13, wherein the at least two mounting openings are formed in the single continuous sheet of metal and a threaded nut is mounted in each of the mounting openings.

19. The deformable tapping plate of claim 18, wherein each of the threaded nuts is a clinch nut and the single continuous sheet of metal provides the mounting surface that defines the mounting plane of the central member.

20. The deformable tapping plate of claim 18, wherein each of the threaded nuts is a staking nut and the staking nuts provide the mounting surface that defines the mounting plane.

* * * * *